(12) United States Patent
Fredrickson et al.

(10) Patent No.: US 12,524,533 B2
(45) Date of Patent: Jan. 13, 2026

(54) CONSEQUENCE EXECUTION

(71) Applicant: Hewlett-Packard Development Company, L.P., Spring, TX (US)

(72) Inventors: Russell Fredrickson, Vancouver, WA (US); Gary T. Brown, Boise, ID (US); John Harris, Boise, ID (US); Marvin Nelson, Boise, ID (US); Gary M. Nobel, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 52 days.

(21) Appl. No.: 18/693,750

(22) PCT Filed: Sep. 22, 2021

(86) PCT No.: PCT/US2021/051453
§ 371 (c)(1),
(2) Date: Mar. 20, 2024

(87) PCT Pub. No.: WO2023/048705
PCT Pub. Date: Mar. 30, 2023

(65) Prior Publication Data
US 2024/0386101 A1 Nov. 21, 2024

(51) Int. Cl.
 *G06F 21/55* (2013.01)
 *G06F 21/56* (2013.01)
(52) U.S. Cl.
 CPC .......... *G06F 21/554* (2013.01); *G06F 21/567* (2013.01)
(58) Field of Classification Search
 CPC .............................. G06F 21/554; G06F 21/567
 See application file for complete search history.

(56) References Cited

U.S. PATENT DOCUMENTS

| | | | |
|---|---|---|---|
| 5,533,123 A | 7/1996 | Force et al. | |
| 9,111,121 B2 | 8/2015 | Pedersen et al. | |
| 9,747,443 B2 * | 8/2017 | Sallam | H04L 63/1408 |
| 9,967,270 B2 | 5/2018 | Kobres et al. | |
| 11,171,976 B2 * | 11/2021 | Adamski | G06F 21/566 |
| 11,188,640 B1 * | 11/2021 | Powell | G06F 21/60 |
| 12,373,610 B1 * | 7/2025 | Pearson | G06F 21/64 |
| 2012/0066759 A1 | 3/2012 | Chen et al. | |
| 2012/0254982 A1 | 10/2012 | Sallam | |
| 2016/0232348 A1 * | 8/2016 | Sallam | G06F 21/572 |

(Continued)

FOREIGN PATENT DOCUMENTS

TW 201317789 A 5/2013

OTHER PUBLICATIONS

Goertzel, K M., et al., "Integrated circuit security threats and hardware assurance countermeasures.", Cross Talk, Nov. 2013, pp. 33-38.

*Primary Examiner* — Stephen T Gundry
(74) *Attorney, Agent, or Firm* — Foley & Lardner LLP (57) ABSTRACT

In some examples, a computing device can include a processing resource and hardware logic to cause the processing resource to receive input from a source indicating a security threat to a portion of a system in communication with the computing device, determine a consequence to address the security threat specific to the portion of the system and a function of the portion of the system, communicate the consequence to a secure processing resource, and determine whether to execute the consequence based on a response from the secure processing resource.

15 Claims, 4 Drawing Sheets

(56) References Cited

U.S. PATENT DOCUMENTS

| | | | |
|---|---|---|---|
| 2017/0142142 A1* | 5/2017 | Kobres | H04L 63/1416 |
| 2017/0329966 A1 | 11/2017 | Koganti et al. | |
| 2018/0211042 A1* | 7/2018 | Reinecke | G06F 21/568 |
| 2020/0117804 A1* | 4/2020 | Laffey | H04L 9/0877 |
| 2021/0026967 A1* | 1/2021 | Suryanarayana | G06F 21/575 |
| 2021/0149710 A1* | 5/2021 | Lidman | G06F 9/4498 |
| 2022/0292226 A1* | 9/2022 | Johnson | G06F 21/85 |
| 2022/0309157 A1* | 9/2022 | Thakur | H04L 63/1441 |
| 2023/0109011 A1* | 4/2023 | Fredrickson | G06F 21/554 |
| | | | 711/163 |
| 2024/0045997 A1* | 2/2024 | Volos | G06F 21/805 |
| 2024/0111869 A1* | 4/2024 | Goel | G06F 21/566 |
| 2024/0176900 A1* | 5/2024 | Iyer | G06F 21/604 |
| 2024/0184932 A1* | 6/2024 | Schaffner | G06F 21/64 |
| 2024/0193309 A1* | 6/2024 | Wagner | H04L 9/0869 |
| 2024/0314168 A1* | 9/2024 | Cohen | H04L 63/1483 |
| 2024/0361923 A1* | 10/2024 | Swarbrick | G06F 21/6218 |
| 2025/0124156 A1* | 4/2025 | Beecham | G06F 16/9024 |
| 2025/0150471 A1* | 5/2025 | Fahrny | H04L 63/0823 |

\* cited by examiner

CONSEQUENCE EXECUTION

BACKGROUND

A computing device can be a mechanical or electrical device that transmits or modifies energy to perform or assist in the performance of human tasks. Examples include thin clients, personal computers (e.g., notebook, desktop, etc.), a controller, printing devices, laptop computers, mobile devices (e.g., e-readers, tablets, smartphones, etc.), internet-of-things (IoT) enabled devices, and gaming consoles, among others. A peripheral device is a hardware component attached to a computing device and controlled by the computing device.

DETAILED DESCRIPTION

Security threats to computing devices and systems may vary in level and can merit different responses. For example, a minor security threat can be resolved quickly or may be self-repaired, while a major security threat such as code corruption or an imminent threat to a user's data may necessitate a quicker and/or more complicated response.

Antivirus programs can include computer programs to prevent, detect, and remove security threats such as malicious programs designed to disrupt, damage, and/or gain unauthorized access to a computing device. As used herein, the term computing device refers to an electronic system having a processing resource and a memory resource.

Some approaches to addressing security threats include detecting and determining malicious actors (e.g., computer programs) include utilizing antivirus programs to sense processes and stop or "kill" the process before the process can harm the computing device and/or a system of computing devices. However, such examples neither address execution of consequences on particular portions of the computing device and/or system as a method to provide security for the computing device and/or system nor restrict communication with a secure processing resource of the computing device while still allowing input from the secure processing resource.

In contrast, examples of the present disclosure can provide a device-specific and function-specific consequence to address security threats. As used herein, a consequence can include an action taken to protect a computing system from a security threat. For instance, for a minor security threat that can be resolved by self-repair or waiting for completion of a security task, the consequence may be a temporary disablement of a device (e.g., peripheral device) feature (e.g., print, scan, input/output, etc.). For a major security threat (e.g., code corruption), the consequence may include an immediate device reset. Depending on the at-risk device and its function, consequences can allow for graceful disablement and re-enablement of device functions, and/or resetting the device. In some instances, resetting the device can include resetting portions of the device while allowing some functions to remain (e.g., to maintain working order of the device). Examples of the present disclosure can also provide for the use of one-time-programmable (OTP) fuse configurations, directly connected hardware security monitors, and firmware-initiated security actions for detecting security threats.

Figure 1:
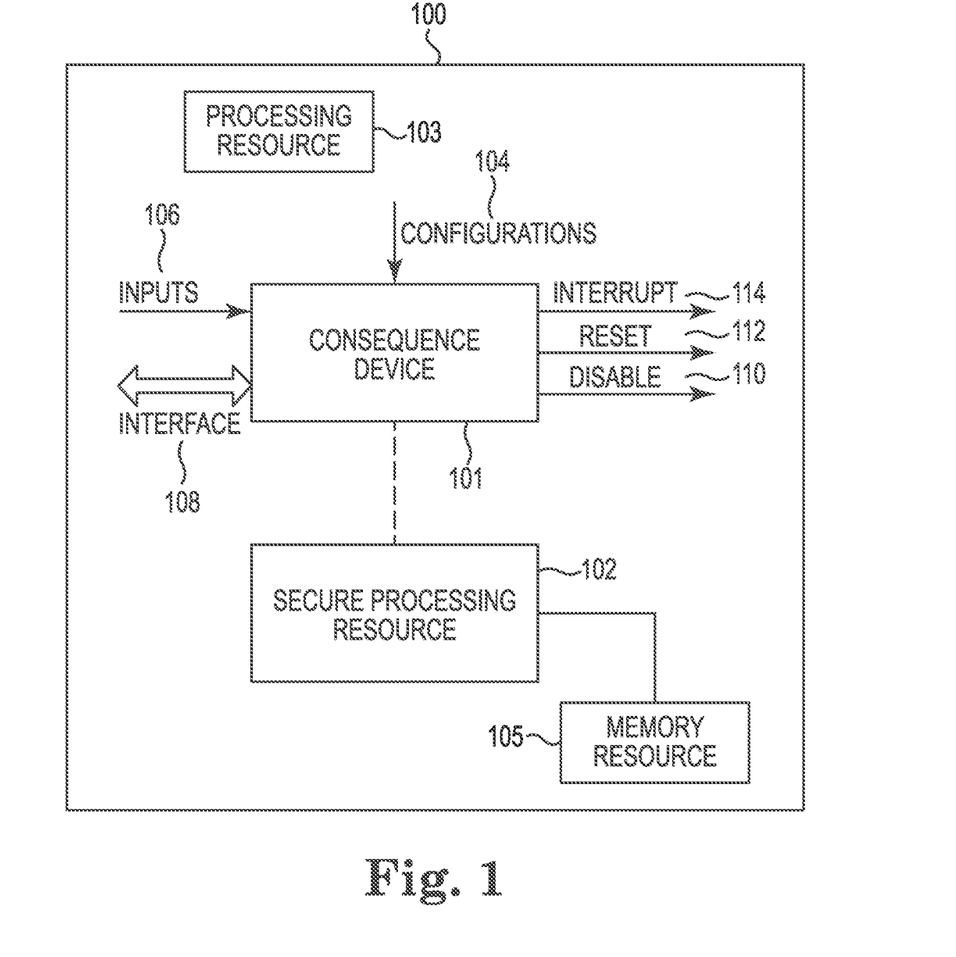
FIG. 1 illustrates a device for consequence execution according to an example.

FIG. 1 illustrates a device 100 (e.g., a computing device 100) for consequence execution according to an example. In some examples, the computing device 100 can include a processing resource 103 communicatively coupled to a consequence device 101 (e.g., hardware logic), a memory resource 105, and/or a secure processing resource 102. Hardware logic, as used herein, can include a sequence of operations performed by hardware and can be contained in electronic circuits of a computing device, such as computing device 100. A hardware logic device (e.g., consequence device 101) can include a device (e.g., a logic die, application-specific integrated circuit (ASIC), corresponding logic in another device, etc.) to perform the sequence of operations "Communicatively coupled," as used herein, can include coupled via various wired and/or wireless connections between devices such that data can be transferred in various directions between the devices. The coupling may not be a direct connection, and in some examples can be an indirect connection.

As described further herein, the memory resource 105 can include instructions that can be executed by the processing resource 103 and/or the secure processing resource 102 to perform particular functions. In some instances, the processing resource 103 may not be present, and the secure processing resource 102 can perform processing functions associated with the consequence device 101 and the computing device 100. In some examples, the computing device 100 can be utilized to interact with other computing devices or peripheral devices.

As noted, the device 100 can be a computing device that can include components such as a processing resource 103 and a secure processing resource 102. As used herein, the processing resource 103 and/or the secure processing resource 102 can include, but are not limited to a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions. In other examples, the device 100 can include instructions stored on a machine-readable medium (e.g., the memory resource, non-transitory computer-readable medium, etc.) and executable by the processing resource 103 and/or the secure processing resource 102. In a specific example, the device 100 utilizes a non-transitory computer-readable medium storing instructions that, when executed, cause the processing resource 103 and/or the secure processing resource 102 to perform corresponding functions. In some examples, instructions may be executed by a processing resource 103 and/or the secure processing resource 102 to cause the computing device 100 and/or the consequence device 101 to perform particular functions.

The secure processing resource 102 may be a computer-on-a-chip, a microprocessor, or other processing resource embedded in a packaging with a plurality of security measures, including physical security measures. The secure processing resource 102 may not output data or instructions in an environment where security cannot be maintained. The secure processing resource 102 may not have a network connection but can receive input and share output with the computing device 100, for instance via communicative coupling with the consequence device 101.

The consequence device 101 can receive input (e.g., stimulus) from a source or a plurality of sources to help detect security threats and can use that input to determine a consequence for a particular device associated with the computing device 100. For instance, the consequence device 101 can receive inputs at 106 from a hardware security monitor (e.g., clock frequency monitor, bus monitor, etc.) and/or other monitors that monitor and/or track hardware for accuracy of function performance of the hardware. In such examples, the hardware security monitor can be directly connected to the consequence device 101 such that a security threat may be detected if an electrical signal from the hardware security monitor is asserted.

For example, a hardware security monitor can monitor a frequency of an oscillator associated with clocks of the computing system. The hardware security monitor can monitor during a boot process a particular clock associated with an OTP controller. If the hardware security monitor detects the clock is not within a particular threshold value, the hardware security monitor can send, at 106, input to the consequence device 101 informing it that something is not right. In such an example, the hardware security monitor and the consequence device 101 may be configured by firmware during boot, and the hardware security monitor can continue its assigned monitoring task.

In some examples, the secure processing resource 102 can perform configurations (e.g., configuration of hardware security monitors) during the boot process and check that a hardware security monitor is properly configured. The secure processing resource, in some instances, can determine that input generated at 106 is handled appropriately, and if not, consequences can be influences at 106.

The input from the hardware security monitor at 106 can prompt the consequence device 101 to generate an interrupt 114. The interrupt 114 may be sent to the secure processing resource 102, where it awaits a response. For instance, the secure processing resource 102 can respond that the consequence device 101 should execute a consequence in response, for instance if the secure processing resource 102 does not recognize the issue (e.g., does not believe that the input at 106 is an expected behavior). In another example, the secure processing resource 102 can respond that the consequence device 101 should not execute a consequence in response, for instance if the issue is expected. For example, an application processing resource associated with a particular peripheral device may notify the consequence device 101 and in turn the secure processing resource 102 that it is working on an intense project and an odd behavior is expected. In some examples, the secure processing resource 102 may not respond, in which case the consequence device 101 executes the consequence.

At 104, a watchdog configuration from OTP fuses can be used to provide input to the consequence device 101. For instance, a system watchdog can be configured during a boot process without intervention from firmware. The configuration can remain constant after power up. The configuration can include reducing risks of a bad actor disabling the secure processing resource 102 by utilizing a timer configured by OTP fuses. For instance, if the secure processing resource 102 has not written a particular pattern to the watchdog within a particular time threshold, the consequence device 101 can execute a consequence based on the secure processing resource 102 having not "fed" the watchdog. The consequence device 101 may determine the consequence based on OTP configurations received at 104 and can execute the consequence in response. This can be done without firmware control for configuration. In such examples, hardware (e.g., a central processing unit) cannot change the OTP configuration, and the OTP configuration cannot be overridden by the secure processing resource 102.

In some examples, the OTP configuration can work in conjunction with the hardware security monitors. For instance, the hardware security monitors may flag activity associated with the secure processing resource 102 (e.g., stopping the secure processing resource 102), and report it to the consequence device 101 at 106. At the same time, because the secure processing resource 102 may not respond in time based on the OTP configuration, the consequence device 101 may execute a consequence to protect the secure processing resource 102 in response to the input from the hardware security monitors at 106 and the OTP configuration input at 104.

At 108, a firmware register interface can facilitate queries to the consequence device 101 from the secure processing resource 102 regarding potential security threats that the computing device 100 detected. For instance, using the firmware register interface, firmware can indicate to the consequence device 101 that it has detected a potential security threat. Also at 108, the firmware register interface can facilitate communication the secure processing resource 102 to the consequence device 101 informing the consequence device 101 that the secure processing resource 102 has detected a potential security threat. The consequence device 101 can receive instructions from the secure processing resource 102 via the firmware register interface at 108 with respect to appropriate consequences and/or non-actions to address the potential security threat (e.g., reset chip, disable subsystem (e.g., printing and/or scanning, input/output (I/O), networking), etc.).

The determined consequences can be executed at 110 (e.g., disable a subsystem or other portion of the system) and 112 (e.g., reset a chip or other portion of the system). Other consequences may be determined and executed based on the particular device and a function of the particular device. In some examples, a warning or other advance notice may be provided to the computing system or affected device such that graceful responses to disablement or resets may occur. For instance, to avoid hardware or other failures, a message such as a user interface message may be displayed (e.g., "Something is wrong.", "Save and close", etc.) that allows a user, the computing system, or the computing device 100 to prepare for shutdown gracefully. In some examples, only particular functions may be disabled while background functions may continue in order to keep the computing system and/or device in working order. Put another way, particular hardware may be disabled, while other hardware remains functioning to reduce a risk of attack while maintaining working order of the computing system and/or device 100.

In a non-limiting example, a bad actor may attempt to use unauthorized ink in a printing device in communication with the computing device 100. The consequence device 101 can receive input at 106, 108, and/or 104 that an unauthorized ink is being used in the printing device. The consequence device 101 can determine an appropriate and effective consequence is to disable the printing device. In response to the determination, the consequence device 101 can disable the printing device at 110 such that the printing device will not print. In other examples, an associated chip may be reset at 112, an interrupt may be sent to the secure processing resource 102 at 114, and/or the consequence device 101 may communicate with the secure processing resource 102 via an interface at 108.

Figure 2:
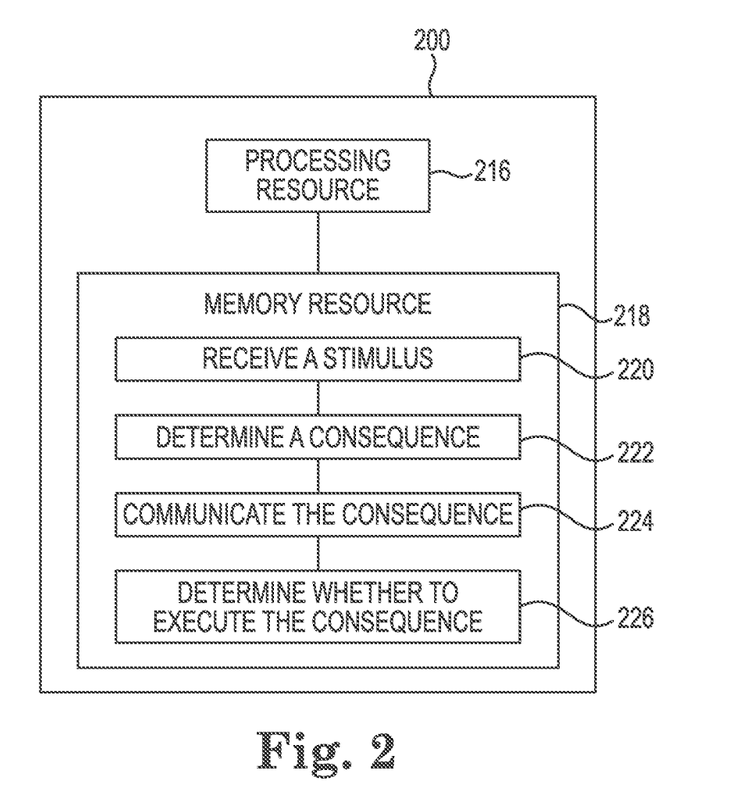
FIG. 2 illustrates another device for consequence execution according to an example.

FIG. 2 illustrates another device 200 for consequence execution according to an example. FIG. 2 illustrates an example of a memory resource 218 for consequence execution. In some examples, the memory resource 218 can be a part of a computing device 200, can be analogous to memory resource 105 as described with respect to FIG. 1, can be in communication with a secure processing resource such as secure processing resource 102 described with respect to FIG. 1, or may be part of a controller that can be communicatively coupled to a system. For example, the memory resource 218 can be part of a device 100 as referenced in FIG. 1. In some examples, the memory resource 218 can be communicatively coupled to a processing resource 216 that can execute instructions 220, 222, 224, 226 stored on the memory resource 218. For example, the memory resource 218 can be communicatively coupled to the processing resource 216 through a communication path. In some examples, a communication path can include a wired or wireless connection that can allow communication between devices and/or components within a device or system. The processing resource 216, in some examples, may be analogous to the processing resource 103 as described with respect to FIG. 1 and/or may be a secure processing resource analogous to the secure processing resource 102, as described with respect to FIG. 1.

The memory resource 218 may be electronic, magnetic, optical, or other physical storage device that stores executable instructions. Thus, a non-transitory machine-readable medium (MRM) (e.g., a memory resource 218) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 218) may be disposed within a controller and/or computing device. In this example, the executable instructions 220, 222, 224, 226 can be "installed" on the device. In some examples, the non-transitory machine-readable medium (e.g., a memory resource) can be a portable, external, or remote storage medium, for example, that allows a computing system to download the instructions 220, 222, 224, 226 from the portable/external/remote storage medium. In this situation, the executable instructions may be part of an "installation package". As described herein, the non-transitory machine-readable medium (e.g., a memory resource 218) can be encoded with executable instructions for performing calculations or computing processes.

The device 200 can execute a consequence to protect an associated system and/or device despite isolation of a secure processing resource. The device 200 can allow for the secure processing resource to determine that something may be wrong in the system and/or associated devices and enact actions outside of its isolation while remaining physically isolated from the rest of the system.

The instructions 220, when executed by a processing resource such as the processing resource 216, can include instructions to receive input indicating a security threat to a portion of a system in communication with the computing device. In some examples, the input can be received using a direct-connected security monitor, and OTP fuse configuration, a firmware-initiated security action, or any combination thereof. For instance, when a security threat is detected, an interrupt can be asserted to alert the rest of the system that a security threat has been detected to give the system time to reach and/or fix the issue before a consequence is executed.

The instructions 222, when executed by a processing resource such as the processing resource 216, can include instructions to determine a consequence to address the security threat specific to the portion of the system and a function of the portion of the system. For instance, lower security threats may have different, lesser consequences as compared to higher security threats. In addition, the function of the associated portion (e.g., functions of peripheral devices) may affect the type and severity of consequence. The consequence, for instance, can include a temporary disablement of a function of the portion of the system or a reset of the portion of the system, among others. In some examples, an entire system or device is reset to facilitate reconstruction of a root of trust. In some instances, a programmable period of time is provided between security threat detection and execution of the consequence. For instance, firmware can cancel a consequence if it is determined the security threat has been handled or resolved within the period of time.

The instructions 224, when executed by a processing resource such as the processing resource 216, can include instructions to communicate the consequence to a secure processing resource, and the instructions 226, when executed by a processing resource such as the processing resource 216, can include instructions to determine whether to execute the consequence based on a response from the secure processing resource. For instance, the secure processing resource may have a definitive response or may be non-responsive.

In some examples, the consequence can be executed when the response is a non-response to the communication or when the response to the communication indicates execution of the consequence. The consequence may not be executed when the response to the communication indicates avoidance of execution of the consequence.

Execution of the consequence can include assertion of an interrupt to let the system know that a consequence has been executed. Programmed consequences can be executed by asserting directly connected hardware digital signals to hardware subsystems. When executing a non-destructive consequence (e.g., temporary disablement), the consequence can be canceled via a firmware interface of the computing device executing the consequence.

Execution of the consequence can include the hardware digital signals going directly to the subsystems. For instance, in non-limiting examples, for a reset consequence, a chip can be reset to prevent potential malicious code or hardware conditions from executing. To disable printing, a printing subsystem can be connected to prevent useful printing such as forced printing of whitespace instead of ink or connecting to scanning subsystems to force scanning of whitespace. The direct connect hardware consequences in the ASIC can reduce hardware tampering from external sources to reduce reactions to security issues, and the direct connect hardware consequences may not rely on potentially compromised firmware on an application processor to disable subsystems. For instance, a secure processor may interact with a computing device executing punishments at the exclusion of other devices. Execution of the consequence, in some examples can be performed by a consequence device comprising hardware logic such as an embedded ASIC as described with respect to FIG. 1.

Figure 3:
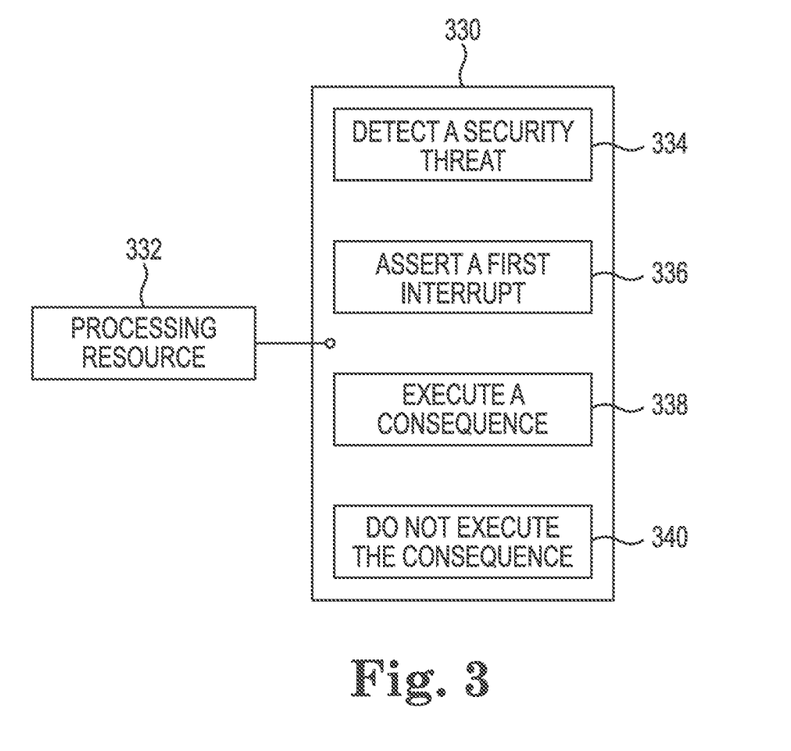
FIG. 3 illustrates yet another device for consequence execution according to an example.

FIG. 3 illustrates yet another device for consequence execution according to an example. In some examples, the device can be a computing device or controller that includes a processing resource 332 communicatively coupled to a memory resource 330. The device, in some examples, may be analogous to devices 100 and/or 200 described with respect to FIGS. 1 and 2, the processing resource 332 may be analogous to the processing resource 216 described with respect to FIG. 2, the processing resource 103 described with respect to FIG. 1, and/or the secure processing resource 102 described with respect to FIG. 1, and the memory resource 330 may be analogous to the memory resource 218 described with respect to FIG. 2, may be analogous to the memory resource 105 as described with respect to FIG. 1, may be in communication with a secure processing resource such as secure processing resource 102 described with respect to FIG. 1, or may be part of a controller that can be communicatively coupled to a system. As described herein, the memory resource 330 can include or store instructions 334, 336, 338, 340 that can be executed by the processing resource 332 to perform particular functions. In some instances, the particular functions may be performed by a consequence device comprising hardware logic such as an embedded ASIC as described with respect to FIG. 1.

In some examples, the device can include instructions 334 that can be executed by the processing resource 332 to detect a security threat to a portion of a system in communication with the computing device. For instance, based on inputs from an OTP configured watchdog timer, direct connected hardware security monitors, and firmware-initiated security actions, the device can detect a security threat.

The device can include instructions 336 that can be executed by the processing resource 332 to assert a first interrupt to alert the system and a secure processing resource of the system of the detection of the security threat. For example, in response to detection of the security threat, the interrupt can be asserted to alert the system and give it time to react or fix the issue before a consequence is enacted.

In some examples, the device can include instructions 338 that can be executed by the processing resource 332 to execute a consequence to address the security threat specific to the portion of the system and a function of the portion of the system in response to a threshold time period passing without a response from the system, the secure processing resource, or both. For instance, the device may query the secure processing resource to determine if the security threat was anticipated and should be ignored (e.g., canceled consequence). If no response is received from the secure processing resource, the consequence is executed. In some instances, a consequence can be canceled if the issue is resolved within a particular threshold time period.

In some examples, the instructions 338 can be executed to execute the consequence in response to an affirmative consequence execution response within the threshold period of time from the system, the secure processing resource, or both. For instance, in the aforementioned example, if the secure processing resource responds with an affirmative response to executing the consequence, the device can execute the consequence.

The consequence, in some examples, can be executed by asserting a directly connected hardware signal to the portion of the system. In response, a second interrupt can be asserted to communicate execution of the consequence to the system and the secure processing resource. The consequence can include a chip reset, disablement of a function of a device (e.g., disable printing, disable scanning, etc.), temporary disablement, etc. In some examples, the consequence is a non-destructive consequence (e.g., the temporary disablement consequence), and the consequence can be canceled in response to receiving an indication that the security threat is over. For instance, printing functionalities may be disabled based on the use of unauthorized ink until it is determined authorized ink has been loaded into the printing device.

In some examples, the device can include instructions 340 that can be executed by the processing resource 332 to not execute the consequence in response to an avoid consequence execution response within the threshold period of time from the system, the secure processing resource, or both. For instance, in the aforementioned example, if the secure processing resource responds with a do not execute response to executing the consequence, the device can refrain from executing the consequence. In such an example, the secure processing resource may be anticipating the security threat (e.g., anticipating period of increased action at a peripheral device).

In some examples, the instructions can be executable to accept interaction from the secure processing resource and reject interaction from other sources. For instance, the secure processing resource may be physically isolated from devices other than the device executing the consequence, and the device may be isolated from other sources of data, allowing for secure communication between the device and the secure processing resource.

Figure 4:
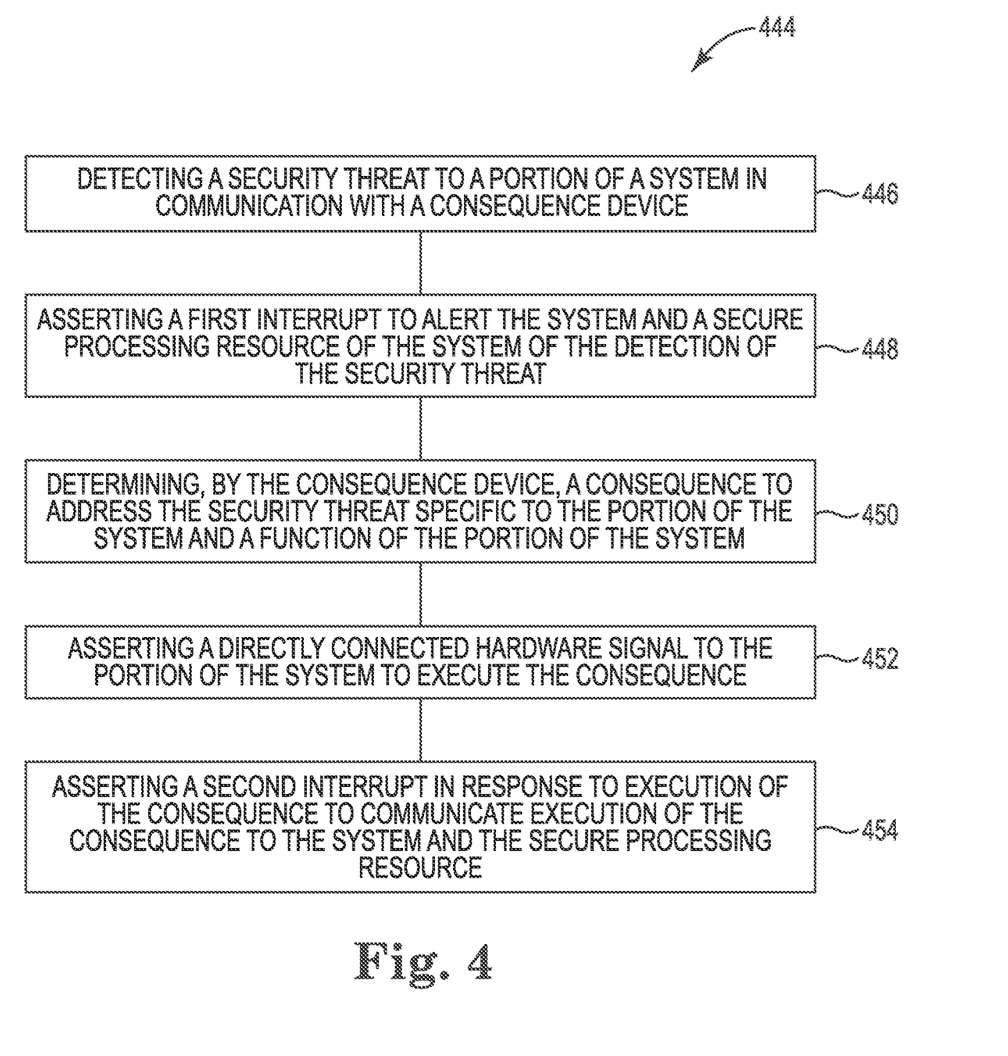
FIG. 4 illustrates a method for consequence execution according to an example.

FIG. 4 illustrates an example of a method 444 for consequence execution according to an example. The method 444 may be performed by a device 100, device 200, consequence device 100, and/or controller as described with respect to FIGS. 1, 2, and 3. In some examples, the method 444 can be performed by instructions executable to cause a computing device to perform particular functions.

The method 444, at 446, includes detecting a security threat to a portion of a system in communication with a consequence device. For instance, the consequence device may receive inputs from an OTP configured watchdog, direct connected hardware security monitors, and/or firmware-initiated security actions (e.g., via a register bus interface) that suggest a security threat.

At 448, the method 444 includes asserting a first interrupt to alert the system and a secure processing resource of the system of the detection of the security threat. The interrupt can be asserted (in response to detection of the security threat) to alert the system and give it time to react or fix the issue before a consequence is enacted.

At 450, the method 444 includes determining, by the consequence device, a consequence to address the security threat specific to the portion of the system and a function of the portion of the system. For instance, the consequence can be merit-based, as different security threats merit different responses. The consequence for a minor threat that can be resolved by self-repair or by waiting for the completion of a security task may be the temporary disablement of a device feature (e.g., print, scan, or I/O). The consequence for a major security threat (e.g., code corruption) may include the device resetting immediately.

The method 444, at 452, includes asserting a directly connected hardware signal to the portion of the system to execute the consequence. For instance, asserting the directly connected hardware signal to execute the consequence can include asserting the directly connected hardware signal to reset the system, disable the portion of the system, or a combination thereof. In some examples, an instruction can be received from the secure processing resource to execute a particular consequence in response to asserting the first interrupt, and the directly connected hardware signal can be asserted to the portion of the system to execute the particular consequence.

At 454, the method 444 includes asserting a second interrupt in response to execution of the consequence to communicate execution of the consequence to the system and the secure processing resource. In some examples, advanced warning may be given prior to non-destructive consequences, such that the system remains in working order during and after the consequence execution.

The figures herein follow a numbering convention in which the first digit corresponds to the drawing figure number and the remaining digits identify an element or component in the drawing. For example, reference numeral 100 may refer to element 102 in FIG. 1 and an analogous element may be identified by reference numeral 200 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A computing device, comprising:
   a processing resource; and
   hardware logic to cause the processing resource to:
      receive input from a source indicating a security threat to a portion of a system in communication with the computing device;
      determine a consequence to address the security threat specific to the portion of the system and a function of the portion of the system;
      communicate the consequence to a secure processing resource;
      determine if the security threat should be ignored in response to the consequence being communicated to the secure processing resource; and
      determine whether to execute the consequence based on a response from the secure processing resource.

2. The computing device of claim 1, further comprising the hardware logic to cause the processing resource to execute the consequence when the response is a non-response to the communication.

3. The computing device of claim 1, further comprising the hardware logic to cause the processing resource to:
   execute the consequence when the response to the communication indicates execution of the consequence; and
   do not execute the consequence when the response to the communication indicates avoidance of execution of the consequence.

4. The computing device of claim 1, wherein the consequence is a temporary disablement of a function of the portion of the system.

5. The computing device of claim 1, wherein the consequence is a reset of the portion of the system.

6. The computing device of claim 1, further comprising the hardware logic to cause the processing resource to receive the input as a one-time programmable (OTP) fuse configuration.

7. The computing device of claim 1, further comprising the hardware logic to cause the processing resource to receive the input via a direct-connected security monitor.

8. The computing device of claim 1, further comprising the hardware logic to cause the processing resource to receive the input via a firmware-initiated security action.

9. A non-transitory machine-readable storage medium including instructions that when executed cause a processing resource of a computing device to:
   detect a security threat to a portion of a system in communication with the computing device;
   assert a first interrupt to alert the system and a secure processing resource of the system of the detection of the security threat;
   in response to a threshold time period passing without a response from the system, the secure processing resource, or both, execute a consequence to address the security threat specific to the portion of the system and a function of the portion of the system;
   in response to an affirmative consequence execution response within the threshold period of time from the system, the secure processing resource, or both, execute the consequence; and
   in response to an avoid consequence execution response indicating the security threat should be ignored within the threshold period of time from the system, the secure processing resource, or both, do not execute the consequence.

10. The medium of claim 9, further comprising the instructions to cause the processing resource to:
   execute the consequence by asserting a directly connected hardware signal to the portion of the system; and
   assert a second interrupt in response to execution of the consequence to communicate execution of the consequence to the system and the secure processing resource.

11. The medium of claim 10, further comprising the instructions executable to accept interaction from the secure processing resource and reject interaction from other sources.

12. The medium of claim 9, wherein the consequence is a non-destructive consequence, and the instructions are further to cause the processing resource to:
   cancel the consequence in response to receiving an indication that the security threat is over.

13. A method, comprising:
   detecting a security threat to a portion of a system in communication with a consequence device;
   asserting a first interrupt to alert the system and a secure processing resource of the system of the detection of the security threat;
   determining, by the consequence device, a consequence to address the security threat specific to the portion of the system and a function of the portion of the system;
   determining, by the consequence device, that a response indicating the security threat should be ignored has not been received;
   asserting a directly connected hardware signal to the portion of the system to execute the consequence; and
   asserting a second interrupt in response to execution of the consequence to communicate execution of the consequence to the system and the secure processing resource.

14. The method of claim 13, wherein asserting the directly connected hardware signal to execute the consequence comprises asserting the directly connected hardware signal to reset the system, disable the portion of the system, or a combination thereof.

15. The method of claim 13, further comprising:
receiving an instruction from the secure processing resource to execute a particular consequence in response to asserting the first interrupt; and
asserting the directly connected hardware signal to the portion of the system to execute the particular consequence.

\* \* \* \* \*